United States Patent
Gallagher

(10) Patent No.: US 8,057,121 B2
(45) Date of Patent: Nov. 15, 2011

(54) CONNECTOR ASSEMBLIES FOR CONNECTING MEMBERS UNDER TENSION

(75) Inventor: John Gallagher, Aberdeen (GB)

(73) Assignee: Oil States Industries Limited, Aberdeen (GB)

( * ) Notice: Subject to any disclaimer, the term of this patent is extended or adjusted under 35 U.S.C. 154(b) by 448 days.

(21) Appl. No.: 12/296,091

(22) PCT Filed: Mar. 28, 2007

(86) PCT No.: PCT/GB2007/001145
§ 371 (c)(1), (2), (4) Date: Dec. 3, 2008

(87) PCT Pub. No.: WO2007/113493
PCT Pub. Date: Oct. 11, 2007

(65) Prior Publication Data
US 2009/0175690 A1    Jul. 9, 2009

(30) Foreign Application Priority Data
Apr. 4, 2006  (GB) .................................. 0606806.8

(51) Int. Cl.
*F16B 21/02* (2006.01)
(52) U.S. Cl. ........................................ 403/318; 403/349
(58) Field of Classification Search .............. 403/109.3, 403/109.5, 109.7, 318, 319, 328, 348, 349, 403/379.2, 379.5; 405/224, 224.4, 169, 277; 285/316; 166/240, 242.6
See application file for complete search history.

(56) References Cited

U.S. PATENT DOCUMENTS

| | | | | |
|---|---|---|---|---|
| 828,243 A * | 8/1906 | Polmann | ....................... | 285/375 |
| 920,188 A * | 5/1909 | Shumacher | .................... | 403/190 |
| 1,099,670 A * | 6/1914 | Shoffner | ...................... | 279/19.6 |
| 1,362,521 A * | 12/1920 | Zadora | .............................. | 285/85 |
| 2,250,463 A * | 7/1941 | Boynton | .......................... | 403/13 |
| 2,799,344 A * | 7/1957 | Muse | ............................. | 166/123 |
| 2,814,523 A * | 11/1957 | Stolm | ........................ | 294/86.21 |
| 3,072,430 A * | 1/1963 | Fahrenwald | ................ | 294/82.24 |
| 3,211,479 A * | 10/1965 | Brown | ........................... | 285/360 |
| 4,061,389 A * | 12/1977 | Keller et al. | .................. | 294/86.3 |
| 4,249,761 A * | 2/1981 | Nishimura | .................. | 292/251.5 |
| 4,391,326 A * | 7/1983 | Greenlee | ........................ | 166/240 |
| 4,483,563 A * | 11/1984 | van der Heyden | .............. | 294/90 |

(Continued)

FOREIGN PATENT DOCUMENTS

GB    2 178 101    2/1987

(Continued)

*Primary Examiner* — Joshua Kennedy
(74) *Attorney, Agent, or Firm* — Joseph S. Heino; Patrick M. Bergin

(57) ABSTRACT

A releasable connector assembly comprising a socket body 2 and a plug body 3. The socket body 2 has a set of channels 15 formed therein and the plug body 3 having a corresponding set of radial tabs 7 formed thereon, the channels 15 forming a keyway for the tabs 7 such that load bearing projections 5, 14 on the bodies are releasably engageable in the manner of a bayonet coupling. The assembly is characterised in that a set of locking pins are provided on the socket member that are extendable into the channels 15 so as, in use, to trap the tabs 7 in undercuts 15k of the channels 15, thereby preventing unintentional release of the plug 3 from the socket 2, and retractable from the channels 15 so as to enable release of the plug 3 from the socket 2.

20 Claims, 4 Drawing Sheets

U.S. PATENT DOCUMENTS

| | | |
|---|---|---|
| 4,907,914 A | 3/1990 | Gundersen |
| 5,741,084 A * | 4/1998 | Del Rio et al. ............... 403/349 |
| 5,755,533 A * | 5/1998 | Snyder et al. ................ 405/224 |
| 6,231,265 B1 * | 5/2001 | Rytlewski et al. .......... 403/322.1 |
| 6,409,428 B1 * | 6/2002 | Moog ........................... 405/169 |
| 6,877,778 B2 * | 4/2005 | Froment et al. .............. 285/361 |
| 6,905,151 B2 * | 6/2005 | Froment et al. .............. 285/376 |
| 7,373,986 B2 * | 5/2008 | Pollack et al. ................ 166/359 |
| 7,585,126 B2 * | 9/2009 | Ling et al. ................. 403/359.4 |

FOREIGN PATENT DOCUMENTS

| | | |
|---|---|---|
| WO | WO 89/11415 | 11/1989 |
| WO | WO 95/29839 | 11/1995 |

* cited by examiner

CONNECTOR ASSEMBLIES FOR CONNECTING MEMBERS UNDER TENSION

This is a 371 national phase application of PCT/GB2007/001145 filed 28 Mar. 2007, claiming priority to United Kingdom Patent Application No. 0606806.8 filed 4 Apr. 2006, the contents of which are incorporated herein by reference.

FIELD OF THE INVENTION

The present invention relates to connector assemblies for connecting members that, in use, are maintained under tension. In particular, the present invention relates to connector assemblies for connecting tendon strings to anchor templates in tether systems for tethered leg platforms.

BACKGROUND OF THE INVENTION

GB2178101 discloses a tether anchor arrangement comprising a socket body and an plug body, as shown in FIG. 1, wherein each body is provided with radially extending, load bearing projections. In use, as the plug body is inserted into the socket body, radially extending tabs provided on the socket body engage into guide channels recessed in the plug body which effect relative rotation between the bodies as they are interengaged so as to bring the radially extending projections into axial alignment in the manner of a bayonet coupling. Subsequently, upon tensioning of the tether, the plug body is raised in the socket body, whereupon the tabs and channels co-operate to guide the axially aligned projections into abutment such that the plug is locked in the body. Upon release of tension the plug body drops back into the socket body, whereupon the followers and cams co-operate again to rotate the bodies relative to each other, this time such that the radially extending projections on the bodies can once more pass between each other, thus facilitating disconnection.

Such known connector assemblies have a drawback, however, in that, in use, they can become disconnected upon a temporary drop in the tension in the tether. In particular, this is widely known to be problematic in applications such as connecting tendon strings to anchor templates in tether systems for tethered leg platforms, wherein members can occasionally become un-tensioned during use due to alternating sea water forces acting thereon.

It is an object of the present invention to provide a connector assembly that, in use, cannot become undesirably disconnected upon an incidental release in tension.

According to a first aspect of the present invention there is provided a releasable connector assembly comprising:
a socket member having a substantially cylindrical receptacle formed therein which includes at least one load bearing projection; and
a plug member including at least one load bearing projection;
one of the socket member and the plug member having at least one channel formed therein and the other of the socket member and the plug member having at least one radial tab formed thereon, the or each channel forming a keyway for the or each tab, and the or each load bearing projection of the members being releasably engageable in the manner of a bayonet coupling such that, in a first angular position, they are axially misaligned to allow insertion or removal of the plug from the socket, and in a second angular position, they are axially aligned to prevent removal of the plug from the socket;
the or each channel including a first and second passageway, a first camming surface which extends circumferentially and axially, a second camming surface which extends axially in the opposite direction to and circumferentially away from the first camming surface to a blind undercut, and a third camming surface which extends axially in the same direction as the first camming surface and circumferentially away from the second camming surface;
wherein, upon insertion of the plug member into the socket member with the or each load bearing projection of the members arranged in the first angular position, the at least one tab enters the at least one channel via the first passageway and, engages with the first camming surface, the camming action thereof causing relative rotation between the members as the plug is inserted into the socket so that when the plug is fully inserted into the socket, the tab underlies the second camming surface;
upon subsequent raising of the plug from the socket, the tab engages with the second camming surface, the resulting camming action continuing the plug further to rotate relative to the socket, guiding the tab into the undercut such that the or each load bearing projection of the members are arranged in the second angular position so as to prevent removal of the plug from the socket with any tension on the plug member being transmitted to the socket through the or each projection; and wherein re-lowering of the plug into the socket brings the tab into engagement with the third camming surface, the resulting camming action continuing the relative rotation between the plug and socket so as to bring the tab into alignment with the second passageway and to move the or each load bearing projection of the members back towards their first angular position, whereupon the plug may be completely removed from the socket;
characterised in that at least one moveable locking pin is provided in the one of the socket member and the plug member, the or each pin being extendable into the or each channel so as, in use, to trap the tab in the undercut, thereby preventing unintentional release of the plug from the socket, and being retractable from the or each channel so as to enable release of the plug from the socket.

In an alternative aspect, the or each channel forms a keyway for at least one pair of tabs, wherein:
upon insertion of the plug member into the socket member with the or each load bearing projection of the members arranged in the first angular position, a first and second tab of the or each pair of tabs enter the or each channel, via the first and second passageways respectively, such that the second tab of the or each pair engages with the first camming surface, the camming action thereof causing relative rotation between the members as the plug is inserted into the socket so that when the plug is fully inserted into the socket, the first tab of the or each pair underlies the second camming surface;
upon subsequent raising of the plug from the socket, the first tab of the or each pair engages with the second camming surface, the resulting camming action continuing the plug to rotate further relative to the socket, guiding said first tab of the or each pair into the undercut such that the or each load bearing projection of the members are arranged in the second angular position;
and wherein re-lowering of the plug into the socket brings the first tab of the or each pair of tabs into engagement with the third camming surface, the resulting camming action continuing the relative rotation between the plug and socket so as to bring said first tab into alignment with the second passageway and the second tab of the at least one pair into alignment with a further passageway, and to move the or each load bearing projection of the members back towards their first angular position, whereupon the plug may be completely removed from the socket.

A connector assembly in accordance with the present invention has the advantage that the locking pin prevents the plug from dropping back into the socket, thereby preventing unintentional release of the connector, whilst any upward load applied to the plug is carried by the load bearing projections. As a result, the pin only carries the weight of the plug and any tether attached thereto and hence does not need to be especially strong, and the resulting system is therefore very reliable and robust. Furthermore, it also provides a particularly cost effective construction.

Desirably, the or each locking pin and the or each channel are provided on the socket member whilst the or each tab is provided on the plug member. However, the opposite configuration is also possible.

Preferably, the or each axially extending undercut, tab and locking pin are arranged such that, in use, there is axial play between the or each tab and the or each locking pin. In this way, the plug member can advantageously drop down slightly before contacting the or each locking pin. Desirably, the axial play is substantially 1.0 m.

In an advantageous development, the or each locking pin, in a first position, extends from the other said member via at least one vent hole provided therein. Furthermore, the first position of the at least one locking pin is such that it advantageously directly traps the tab in the undercut, preferably by extending into the mouth of the undercut. Alternatively, however, the first position of the at least one locking pin is such that it indirectly traps the tab in the undercut, desirably by blocking the movement of a base on which the at least one tab is mounted.

Preferably, the or each locking pin, or alternatively an activation means thereof, is accessible from an outer surface of the one of the socket member and plug member such that it is remotely operable between its extended and retracted positions. In particular, the or each locking pin is desirably operable via remotely operated vehicle (ROV). However, it will be appreciated that the or each locking pin could alternatively be operable via a server motor or any other known means.

Advantageously, the socket body is provided with a plurality of equally angularly spaced load bearing projections that co-operate with complementary load bearing projections provided on the plug body. Furthermore, a plurality of equally angularly spaced channels are likewise preferably provided on one of the bodies, which desirably co-operate with a complementary number of tabs, whereby the channels are preferably linked together such that the tabs rotate from one channel to another as the connector is engaged and disengaged, each entry portion for one channel also operating as the exit portion for the preceding channel. A locking pin is then advantageously associated with the blind undercut of each channel, although it will be understood that the number of locking pins and channels provided may be varied depending on the particular circumstances and design of the connector assembly.

In one development, the or each channel comprises first, second and third camming surfaces only. Accordingly, during engagement, the or each locking pin is desirably retracted from the or each channel so as to allow the or each tab to rise into the or each undercut, the or each locking pin subsequently being extended into the or each channel ready for use. In this way, the tab is advantageously guided into the undercut via a simple camming system. However, during engagement, the or each locking pin is alternatively biased to extend into the or each channel by at least one spring and is provided with a camming surface such that it automatically retracts when engaged by the or each associated tab as it rises into the or each undercut. In this way, effective locking of the plug in the socket is ensured without the need to actively operate the or each locking pin. Either way, the pin has to be actively retracted to allow release.

In an alternative development, the or each channel includes at least one further camming surface such that the or each locking pin can advantageously be extended during engagement. In particular, a the or each fourth camming surface preferably extends axially in the same direction and circumferentially towards the or each first camming surface such that, whilst the plug is being raised from the socket during engagement, the or each second camming surface guides the or each tab under the or each locking pin and undercut and into engagement with the or each fourth camming surface, the resulting camming action rotating the plug relative to the socket in a reverse sense and guiding the or each tab over the or each locking pin and into the or each undercut. In this way, effective locking of the plug in the socket is again ensured without the need to actively operate the or each locking pin, although it does have to be actively retracted to allow release.

BRIEF DESCRIPTION OF THE DRAWINGS

In order that the invention may be well understood, there will now be described an embodiments thereof, given by way of example, reference being made to the accompanying drawing, in which.

DETAILED DESCRIPTION

Figure 1:
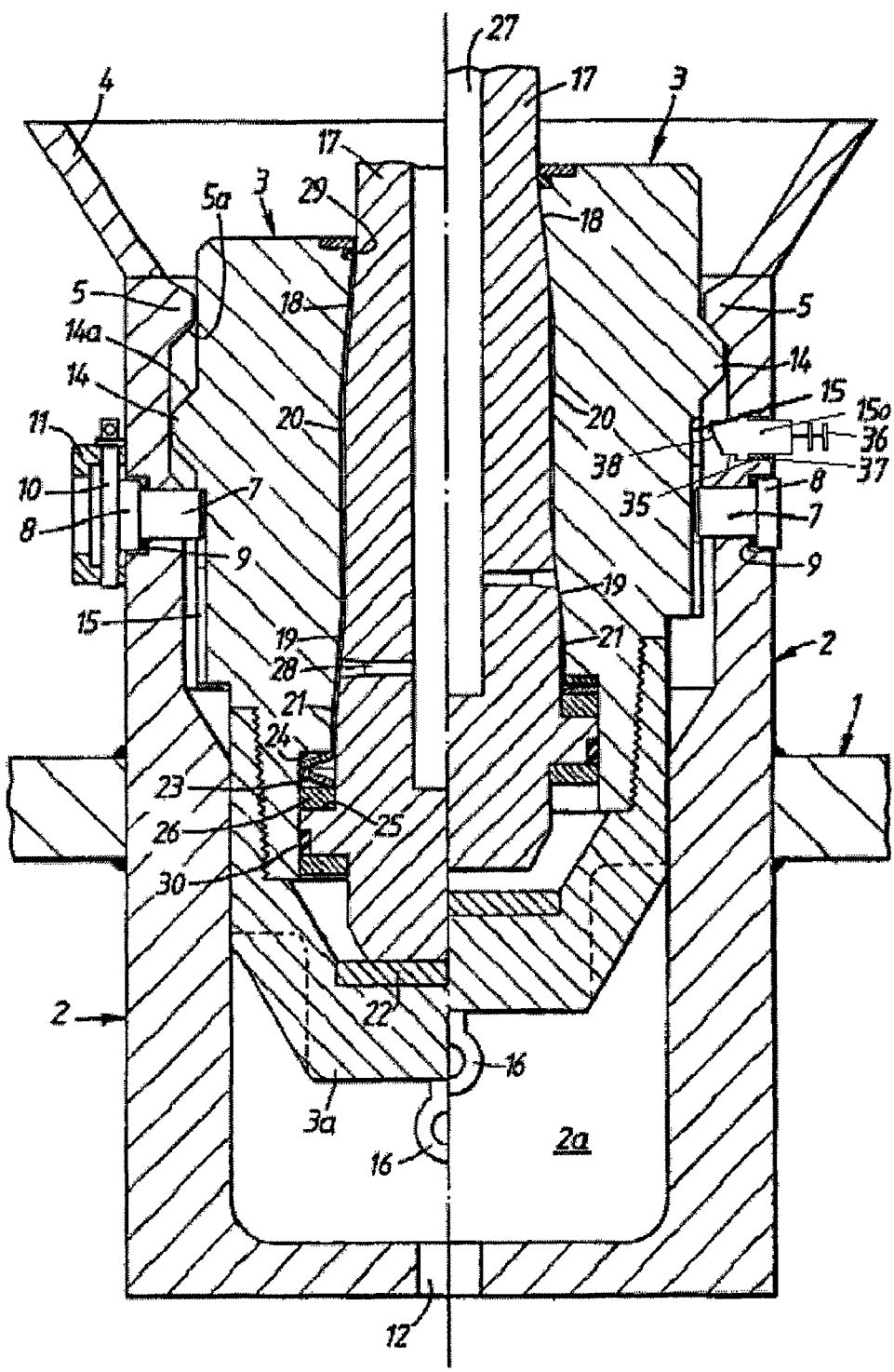
FIG. 1 is an axial section through an embodiment of a connector assembly according to the first aspect of the invention.
Figure 2:
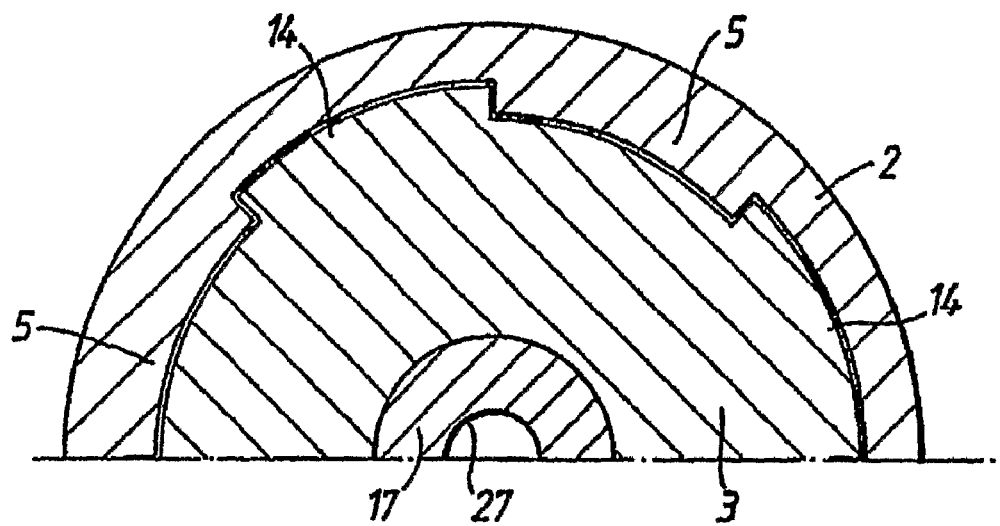
FIG. 2 is a section perpendicular to the axis through the connector assembly of FIG. 1.
Figure 3:
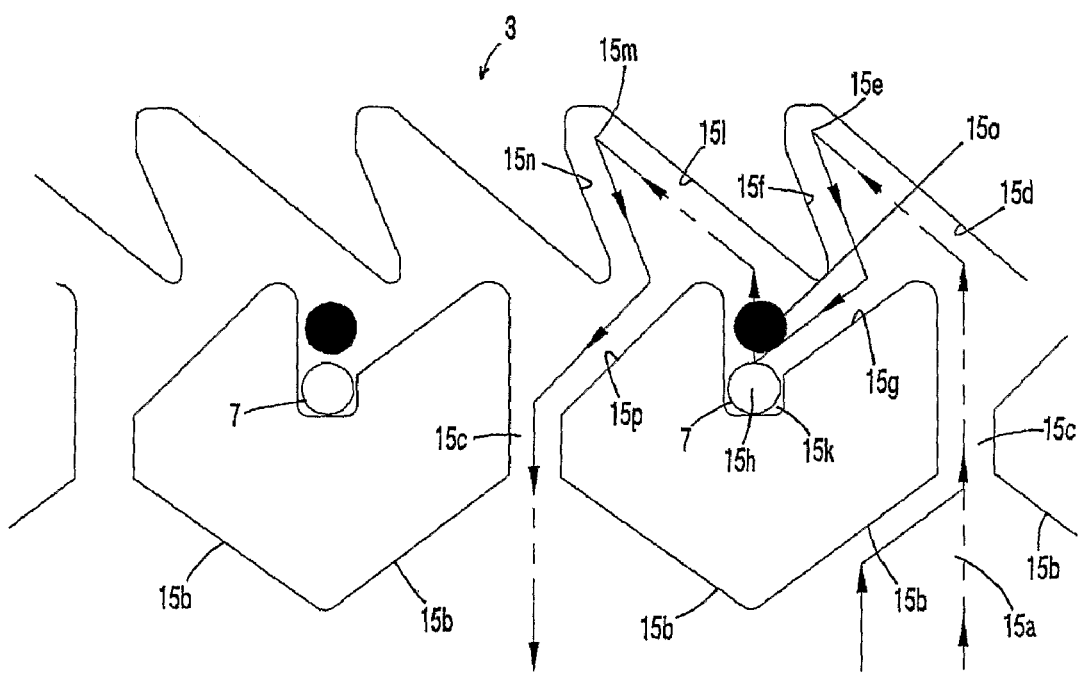
FIG. 3 is a developed view of a set of channels of the connector assembly according to FIG. 1.

Referring to FIGS. 1-3, there is shown an embodiment of a connector assembly according to the first aspect of the invention, which is substantially similar to the known connector assembly according to GB2178101 and comprises a socket body 2 and a plug body 3, which, in use, are each connected to a member maintained under tension.

The socket body 2 provides a generally cylindrical receptacle 2a for the plug body 3, which receptacle may be closed at its lower end. At the upper end, the socket body 2 is provided with a generally frustro-conical guide ring 4 surrounding the upper end for guiding the plug body 3 into the receptacle 2a, and the region of the upper end is provided with regularly spaced radially inwardly extending projections 5 each of which have an axially directed shoulder for load bearing. As shown in FIG. 2, in this particular embodiment, four projections 5 are provided equally angularly spaced around the circumference of the receptacle 2a. It will be appreciated, however, that the number of projections 5 provided may be varied depending on the particular circumstances and design of the connector assembly. Below the projections 5, a corresponding number of radially inwardly projecting tabs 7 are provided.

The plug body 3 has a generally cylindrical outer surface that, at its upper end, is provided with radially outwardly extending projections 14, corresponding to the projections 5 of the socket body 2, which provide axially directed shoulders 14a for abutment with the shoulders 5a. Specifically, the projections 14 are arranged relative to the projections 5 such that, as the plug body 3 is inserted into the socket body 2, they can pass between and beyond each other, as shown in FIG. 2. Rotation of the bodies 2, 3 relative to each other then brings the projections 5, 14 into axial alignment with each other such that tensioning of the bodies 2, 3 brings the shoulders 5a, 14a into abutment.

Below the projections 14, the plug body 3 is provided with channels 15 that form keyways for receiving the tabs 7 of the socket body 2 (see FIG. 3) such that, as the plug body 3 is inserted into the socket body 2, the tabs 7 are received into the channels 15 and initially cause any relative rotation between the bodies 2, 3 necessary for allowing the projections 14 to pass between the projections 5. Subsequently, as the plug body 3 is inserted further into the socket body 2, the tabs 7 co-operate with the channels 15 to cause further relative rotation of the bodies in order to axially align the shoulders 5a, 14a such that, in use, they can be brought into abutment.

As the bodies 2,3 are moved axially together, and before the projections 5,14 inter-engage, each tab 7 enters a first guide portion 15a of the respective channel 15, which provides converging walls 15b. If the projections 14 are not in the required position for inter-engagement with the projections 5, each tab 7 will contact one of the walls 15b to cause the pug body 3 to rotate as the tabs 7 move along the walls 15b to bring the tabs 7 to generally axial portions 15c. At this point the projections 14, 5 will have the required orientation and during passage of the tabs 7 along portions 15c, projections 15 will pass between and through projections 5. At the point that the projections 14 are clear of projections 5, the tabs 7 contact and move along inclined walls 15d causing further rotation of the plug body 3 until the projections 14 are in partial alignment with projections 5. When the keys reach points 15e at the limit of downward movement of body 3 relative to body 2 (shown on the left-hand side of FIG. 1), body 3 is then lifted. The tabs 7 then run along inclined walls 15f causing the plug body 3 to rotate slightly in the reverse direction and then run along walls 15g causing further rotation of the plug body 3 in the forward direction. Finally the tabs 7 assume positions 15h in which each is located in an undercut 15k. At this point the plug body 3 has rotated to bring projections 14 into full alignment with projections 5 and shoulders 5a, 14a are in abutment (shown on the right-hand side of FIG. 1). Further angular movement of body 3 relative to body 2 is prevented by the lateral walls of each undercut 15k and the recess is sufficiently deep that the respective key is not in contact with the base of the recess (which could prevent full abutment between shoulders 5a,14a).

For disengagement purposes, the channels 15 are designed so that the overall relative direction of rotation on disengagement is the same as that for engagement. However, it is possible that the channels could be arranged so that the path followed by each key is the reverse of that for engagement. For disengagement, then, tension between the bodies is released and the plug body 3 moves downwardly relative to socket body 2, initially axially to release the tabs 7 from undercuts 15k and bring them into contact with inclined walls 15l which cause partial rotation of the plug body 3 until the tabs 7 reach positions 15m. At this point the plug body 3 is lifted and the tabs 7 run along walls 15n causing reverse rotation of the plug body 3 until the tabs contact inclined walls 15p when the direction of rotation reverses and continues in the forward direction to bring the tabs 7 into the axial portions 15c of the adjacent channels 15. At this point the projections 5, 14 are in a relative position whereby they can pass between and beyond each other and hence become disengaged.

Finally, in difference to the known connector assembly according to GB2178101, the socket body 2 includes remotely operable locking pins 150 located in vent holes 35, each of the locking pins 15o having a handle 36 provided thereon which is operable via ROV between an extended and retracted position, wherein, during engagement, the locking pins 15o are retracted inside the socket body 2, and, in use, they are extended into the mouth of the undercuts 15k so as to trap the tabs therein and lock the bodies in engagement. During engagement, the or each locking pin 15o is alternatively biased to extend into the or each channel by at least one spring 37 and is provided with a camming surface 38 such that it automatically retracts when engaged by the or each associated tab 7 as it rises into the or each undercut.

Figure 4:
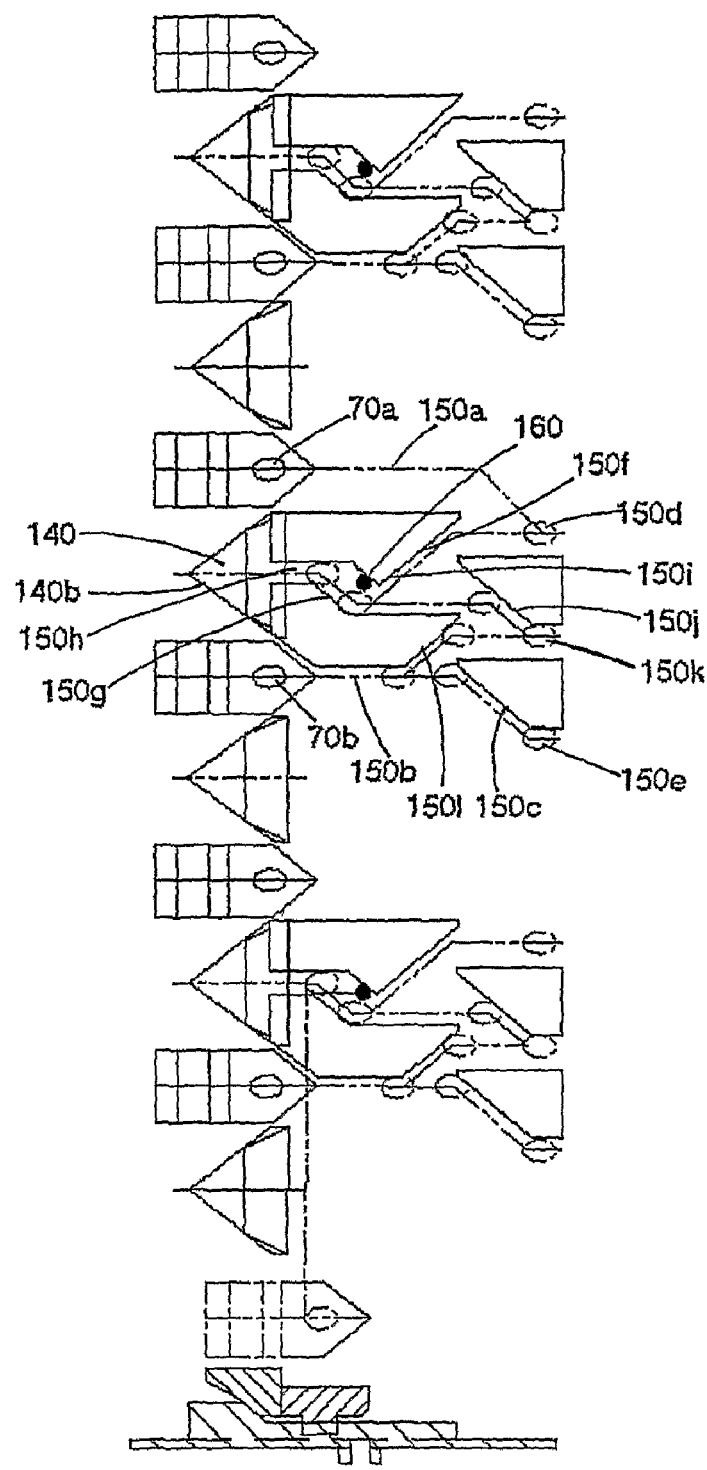
FIG. 4 is a developed view, in use, of a set of channels of a first embodiment of the alternative aspect of the invention.

In an embodiment of the alternative aspect of the invention, there is provided a connector assembly comprising a socket body 20 and plug body 30 arranged substantially according to the bodies 2, 3 of the embodiment of the first aspect of the invention. Consequently, the general arrangement of and features of the bodies 20, 30 that are identical to those of bodies 2, 3 will not be repeated and substantially like components will be referred to by reference numerals multiplied by ten. Referring to FIG. 4, then, the channels 150 of the socket body 20 of the second embodiment are arranged differently to the channels 15 of the socket body 2 of the first embodiment in that they each form keyways for receiving a pair of the tabs 70 provided on the plug body 30. Furthermore, the locking pin 160 is extended from the socket body, rather than retracted therein, during engagement.

As the bodies 20, 30 are moved axially together for the purpose of engagement, each tab 70 enters a guide portion between the projections 140. If the radially extending projections 50, 140 are not already in a rotational position such that they can pass between each other, each tab 70 will contact one of the diverging walls 140b of the projections 140 to cause the plug body 30 to rotate as said tabs 70 move along said walls 140b so as to bring a first set of alternate tabs 70a into axial path 150a of the channels 150 and a second set of alternate tabs 70b into axial path 150b of the channels 150. During passage of the tabs 70a, 70b along paths 150a, 150b, the projections 50, 140 then pass between and through each other until, at the point where they are clear of each other, the tabs 70b contact and move along inclined walls 150c causing the plug body 30 to rotate until the projections 140 move to a position in partial alignment with the projections 50. When the tabs 70a and 70b reach positions 150d and 150e respectively, at the limit of downward movement of the plug body 30 into the socket body 20, the plug body 30 is then lifted. Accordingly, the tabs 70a raise to contact and move along inclined walls 150f, which causes the plug body 30 to rotate further in the forward direction, before sliding under the extended locking pins 160 and contacting and moving along inclined walls 150g, which, in turn, cause the plug body 30 to rotate slightly in the reverse direction. Finally, having moved to the end of the inclined walls 150g, the tabs 70a locate above the locking pins 160 in the axial undercut 150h, at which point the plug body 30 has rotated to bring the projections 140 into full alignment with the projections 50 and the shoulders 140a have been brought into abutment with the shoulders 50a such that the bodies 20, 30, in use, can be maintained under tension.

Specifically, locking pins 160 extend into channels 150 at a position adjacent to inclined walls 150i, which extend under the mouth of the undercuts 150h. Accordingly, any subsequent attempt to lower the plug body 30 relative to the socket body 20 in an attempt to disengage the connector assembly causes the tabs 70a to foul against the remotely operated locking pins 160. In this way, the tabs 70a are, in use, trapped in the undercuts 150h such that further relative angular movement of the bodies 20, 30 is prevented and the connector is maintained in engagement.

For disengagement purposes, the locking pins 160 are, in use, remotely retractable from the channels 150 by ROV prior to a planned disengagement at a future date. Once the pins 160 have been retracted, a release in tension results in the plug body 30 moving downwardly relative to the socket body 20 such that, in the absence of the locking pins 160, the tabs 70a come into contact and follow along inclined walls 150i, which cause the plug body 30 to rotate slightly in the forward direction. At the end of the walls 150i, the tabs 70a then follow an axial path until they come into contact and follow inclined walls 150j, which cause the plug body 30 to rotate further in the forward direction. When the tabs 70a reach position 150k, the limit of downward movement of the plug body 30 into the socket body 20, the plug body 30 is then lifted such that the tabs 70a contact and move along to the end of inclined walls 150l, which cause the plug body 30 to rotate yet further in the forward direction such that the tabs 70a and 70b are guided into axial paths 150b and 150a of the channels 150 respectively. At this point, the projections 50, 140 are in a relative position whereby, upon retraction of the plug body 30, they can pass between and beyond each other such that the bodies 20, 30 can disengage.

Figure 5:
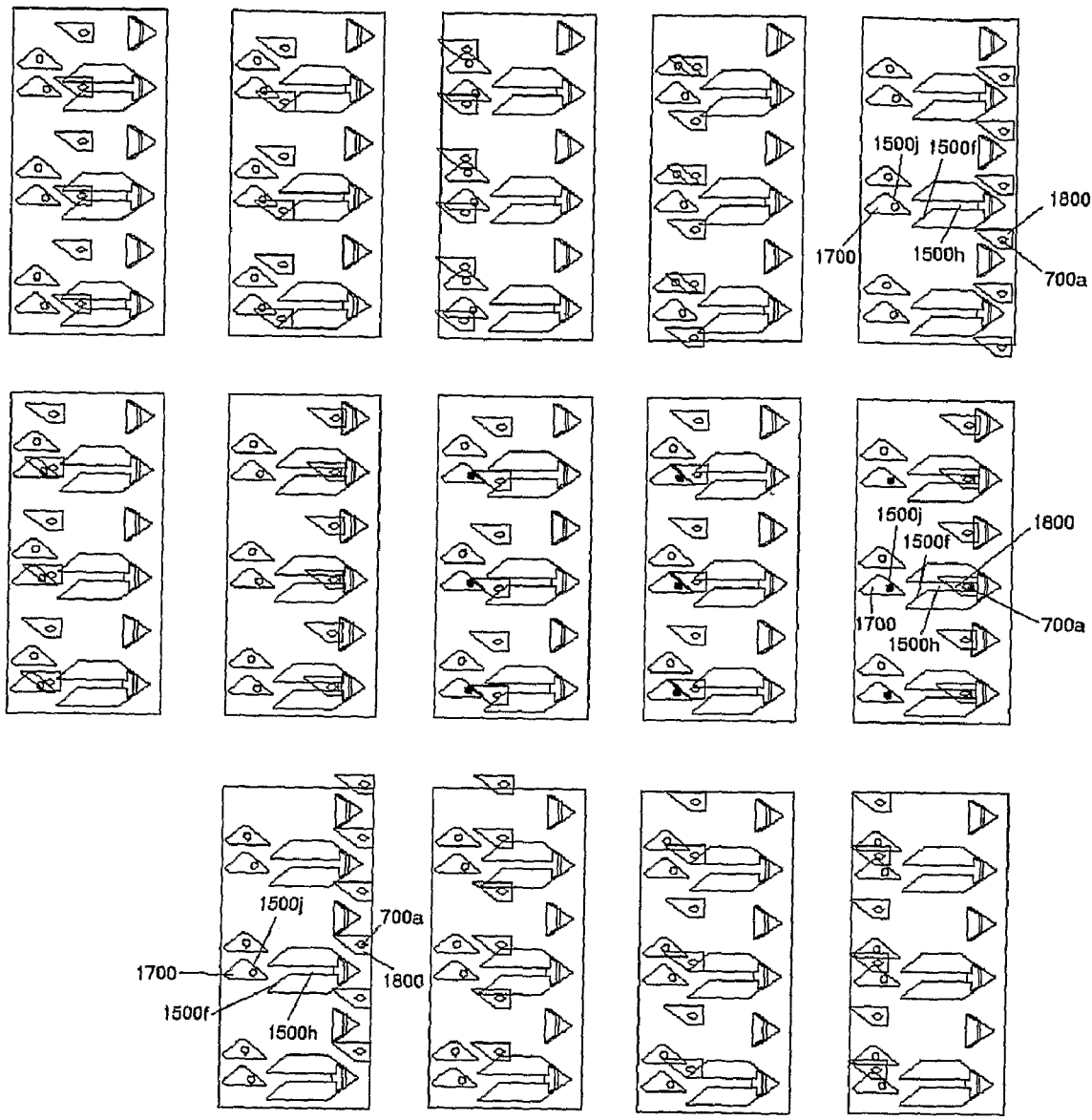
FIG. 5 is a developed view, in use, of a set of channels of a second embodiment of the alternative aspect of the invention.

In a second embodiment of the alternative aspect of the invention, there is provided a connector assembly comprising a socket body 200 and plug body 300 arranged substantially according to the bodies 20, 30 of the second embodiment. Consequently, the general arrangement of and features of the bodies 200, 300 that are identical to those of bodies 20, 30 will not be repeated and like components will be referred to by reference numerals multiplied by 10. Referring to FIG. 5, then, the channels 1500 of the socket body 200 of the second embodiment are arranged slightly differently to the channels 150 of the socket body 20 of the first embodiment in that the inclined wall 1500f leads straight into the undercut 1500h. Furthermore, the locking pins 1600 accordingly do not extend into the channels 1500 during engagement and are instead retracted into the projection 1700 forming the inclined surface 1500j whereby, in use, they are remotely operable by ROV to extend from said projections 1700, though vent holes in the socket body 200, such that they indirectly trap the tabs 700a in the undercuts 1500h via extended load lugs 1800 on which the tabs 700 are mounted.

In use, the locking pins 1600 are retractable back into the socket body 200 prior to a planned disengagement at a future date. Once the pins 1600 have been retracted, a release in tension results in the plug body 300 moving downwardly relative to the socket body 20 such that, in the absence of the locking pins 1600, the tabs 700a are free to travel axially down to inclined surface 1500h and exit therefrom in the same manner as the second embodiment.

Finally, it will be appreciated that many different variations of the described embodiments are possible. For example, it will be understood that the locking pins and radially extending projections could be provided on the plug body whilst the tabs are provided on the socket body, and that the locking pins could be retracted or extended from the body on which they are mounted by any known means other than ROV.

The invention claimed is:

1. A releasable connector assembly comprising:
   a socket member (2) having a substantially cylindrical receptacle (2a) formed therein which includes at least one load bearing projection (5);
   and a plug member (3) including at least one load bearing projection (14);
   one of the socket member (2) and the plug member (3) having at least one channel (15) formed therein and the other of the socket member (2) and the plug member (3) having at least one radial tab (7) formed thereon, the or each channel (15) forming a keyway for the or each tab (7), and the or each load bearing projection (5, 14) of the members (2, 3) being releasably engageable in the manner of a bayonet coupling such that, in a first angular position, they are axially misaligned to allow insertion or removal of the plug (2) from the socket (3), and in a second angular position, they are axially aligned to prevent removal of the plug (2) from the socket (3);
   the or each channel (15) including a first and second passageway (15c), a first camming surface (15d) which extends circumferentially and axially, a second camming surface (15g) which extends axially in the opposite direction to and circumferentially away from the first camming surface (15d) to a blind undercut (15k), and a third camming surface (15l) which extends axially in the same direction as the first camming surface (15d) and circumferentially away from the second camming surface (15g);
   wherein, upon insertion of the plug member (2) into the socket member (3) with the or each load bearing projection (5, 14) of the members (2, 3) arranged in the first angular position, the at least one tab (7) enters the at least one channel (15) via the first passageway (15c) and engages with the first camming surface (15d), the camming action thereof causing relative rotation between the members as the plug (2) is inserted into the socket (3) so that when the plug (2) is fully inserted into the socket (3), the tab (7) underlies the second camming surface (15g);
   upon subsequent raising of the plug (2) from the socket (3), the tab (7) engages with the second camming surface (15g), the resulting camming action continuing the plug (2) further to rotate relative to the socket (3), guiding the tab (7) into the undercut (15k) such that the or each load bearing projection (5, 14) of the members (2, 3) are arranged in the second angular position so as to prevent removal of the plug (2) from the socket (3) with any tension on the plug member (2) being transmitted to the socket (3) through the or each projection (5, 14);
   and wherein re-lowering of the plug (2) into the socket (3) brings the tab (7) into engagement with the third camming surface (15p), the resulting camming action continuing the relative rotation between the plug (2) and socket (3) so as to bring the tab (7) into alignment with the second passageway (15c) and to move the or each load bearing projection (5, 14) of the members (2, 3) back towards their first angular position, whereupon the plug (2) may be completely removed from the socket (3);
   characterised in that at least one moveable locking pin (15o) is provided in the one of the socket member (3) and the plug member (2), the or each pin (15o) being extendable so as, in use, to trap the tab (7) in the undercut (15k), thereby preventing unintentional release of the plug (2) from the socket (3), and being retractable from the or each channel (15) so as to enable release of the plug (2) from the socket (3).

2. A releasable connector assembly according to claim 1, wherein the or each locking pin (15o, 160) is extendable into the mouth of the undercut (15k, 150h) of the or each channel (15, 150) to directly trap the or each associated tab (7, 70a) in the undercut (15k, 150h).

3. A releasable connector assembly according to claim 1, wherein the or each locking pin (15o, 160) is extendable to indirectly trap the or each associated tab (7, 70a) in the undercut by blocking the movement of a base (1700) on which the or each associated tab (7, 70a) is mounted.

4. A releasable connector assembly according to claim 2, wherein the or each locking pin (15o, 160) is biased to extend into the or each channel (15, 150) by at least one spring and is provided with a camming surface such that it automatically retracts when engaged by the or each associated tab (7, 70a), either directly or indirectly, as it rises into the or each undercut (15k, 150h).

5. A releasable connector assembly according to claim 1, wherein the or each channel (15, 150) includes a further camming surface (150g) that extends axially in the same direction and circumferentially towards the second camming surface (150f) such that, whilst the plug (2) is being raised from the socket (3) during engagement, the or each second camming surface (150f) guides the or each associated tab (70a) into the undercut (150h) by guiding it under the or each locking pin (160) and into engagement with the or each further camming surface, (150g) the resulting camming action rotating the plug (2) relative to the socket (3) in a reverse sense and guiding the or each associated tab (70a) over the or each locking pin (160) and into the or each undercut (150h).

6. A releasable connector assembly according to claim 1, wherein the or each locking pin (15o, 160) is remotely operable between its extended and retracted positions via remotely operated vehicle (ROV).

7. A releasable connector assembly according to claim 1, comprising a plurality of equally angularly spaced channels (15, 150), which co-operate with a complementary number of associated tabs (7, 70a, 70b), whereby the channels (15, 150) are preferably linked together such that the associated tabs (7, 70a, 70b) rotate from one channel to another as the connector is engaged and disengaged, each entry portion for one channel also operating as the exit portion for the preceding channel.

8. A releasable connector assembly according to claim 1, wherein the or each axially extending undercut (15k, 150h), associated tab (7, 70a) and locking pin (15o, 160) are arranged such that, in use, there is axial play between the or each associated tab (7, 70a) and locking pin (15o, 160).

9. A releasable connector assembly according to claim 1, wherein the or each locking pin (15o, 160) extends from the one of the socket member (3) and plug member (2) via at least one vent hole provided therein.

10. A releasable connector assembly according to claim 1, wherein the or each locking pin (15o, 160) and the or each channel (15, 150) are provided on the socket member (3) whilst the or each associated tab (7, 70a) is provided on the plug member (2).

11. A releasable connector assembly comprising:
a socket member (2) having a substantially cylindrical receptacle (2a) formed therein which includes at least one load bearing projection (5); and
a plug member (3) including at least one load bearing projection (14);
one of the socket member (2) and the plug member (3) having at least one channel (150) formed therein and the other of the socket member (2) and the plug member (3) having at least one pair of radial tabs (70) formed thereon, the or each channel (150) forming a keyway for the or each pair of tabs (70), and the or each load bearing projection (5, 14) of the members being releasably engageable in the manner of a bayonet coupling such that, in a first angular position, they are axially misaligned to allow insertion or removal of the plug (2) from the socket (3), and in a second angular position, they are axially aligned to prevent removal of the plug (2) from the socket (3);
the or each channel (150) including a first and second passageway (150a, 150b) and a first (150c), second (1500, third (150j) and fourth (150l) camming surface, the first camming surface (150c) extending circumferentially and axially, the fourth camming surface (150l) extending axially in the opposite direction to and circumferentially away from the first camming surface (150c), the third camming surface (150j) extending axially in the same direction as the first camming surface (150c) and circumferentially away from the fourth camming surface (150l), and the second camming surface (150f) extending axially in the same direction as the fourth camming surface (150l) and circumferentially away from the third camming surface (150j) to a blind undercut (150h);
wherein, upon insertion of the plug member (2) into the socket member (3) with the or each load bearing projection (5, 14) of the members arranged in the first angular position, a first (70a) and second (70b) tab of the or each pair of tabs (70) enter the or each channel (150), via the first and second passageways (150a, 150b) respectively, such that the second tab (70b) of the or each pair engages with the first camming surface (150c), the camming action thereof causing relative rotation between the members as the plug (2) is inserted into the socket (3) so that when the plug (2) is fully inserted into the socket (3), the first tab (70a) of the or each pair underlies the second camming surface (150f);
upon subsequent raising of the plug (2) from the socket (3), the first tab (70a) of the or each pair engages with the second camming surface (150f), the resulting camming action continuing the plug (2) to rotate further relative to the socket (3), guiding said first tab (70a) of the or each pair into the undercut (150h) such that the or each load bearing projection (5, 14) of the members are arranged in the second angular position;
upon subsequent re-insertion of the plug (2) into the socket (3), the first tab (70a) of the or each pair of tabs comes into engagement with the third camming surface (150j), the camming action thereof causing further relative rotation between the members as the plug (2) is inserted into the socket (3) so that when the plug (2) is fully inserted into the socket (3), the first tab (70a) of the or each pair underlies the fourth camming surface (150l);
and wherein subsequent re-raising of the plug (2) brings the first tab (70a) of the or each pair of tabs (70) into engagement with the fourth camming surface (150l), the resulting camming action continuing the relative rotation between the plug (2) and socket (3) so as to bring said first tab (70a) into alignment with the second passageway (150b) and the second tab (70b) of the at least one pair into alignment with a further passageway, and to move the or each load bearing projection (5, 14) of the members back towards their first angular position, whereupon the plug (2) may be completely removed from the socket (3);
characterised in that at least one moveable locking pin (160) is provided in the one of the socket member (3) and the plug member (2), the or each pin (160) being extendable so as, in use, to trap the tab (70a) in the undercut, thereby preventing unintentional release of the plug (2) from the socket (3), and being retractable from the or each channel (150) so as to enable release of the plug (2) from the socket (3).

12. A releasable connector assembly according to claim 11, wherein the or each locking pin (15o, 160) is extendable into the mouth of the undercut (15k, 150h) of the or each channel (15, 150) to directly trap the or each associated tab (7, 70a) in the undercut (15k, 150h).

13. A releasable connector assembly according to claim 11, wherein the or each locking pin (15o, 160) is extendable to indirectly trap the or each associated tab (7, 70a) in the undercut by blocking the movement of a base (1700) on which the or each associated tab (7, 70a) is mounted.

14. A releasable connector assembly according to claim 12, wherein the or each locking pin (15o, 160) is biased to extend into the or each channel (15, 150) by at least one spring and is provided with a camming surface such that it automatically retracts when engaged by the or each associated tab (7, 70a), either directly or indirectly, as it rises into the or each undercut (15k, 150h).

15. A releasable connector assembly according to claim 11, wherein the or each channel (15, 150) includes a further camming surface (150g) that extends axially in the same direction and circumferentially towards the second camming surface (150f) such that, whilst the plug (2) is being raised from the socket (3) during engagement, the or each second camming surface (150f) guides the or each associated tab (70a) into the undercut (150h) by guiding it under the or each locking pin (160) and into engagement with the or each further camming surface, (150g) the resulting camming action rotating the plug (2) relative to the socket (3) in a reverse sense and guiding the or each associated tab (70a) over the or each locking pin (160) and into the or each undercut (150h).

16. A releasable connector assembly according to claim 11, wherein the or each locking pin (15o, 160) is remotely operable between its extended and retracted positions via remotely operated vehicle (ROV).

17. A releasable connector assembly according to claim 11, comprising a plurality of equally angularly spaced channels (15, 150), which co-operate with a complementary number of associated tabs (7, 70a, 70b), whereby the channels (15, 150) are preferably linked together such that the associated tabs (7, 70a, 70b) rotate from one channel to another as the connector is engaged and disengaged, each entry portion for one channel also operating as the exit portion for the preceding channel.

18. A releasable connector assembly according to claim 11, wherein the or each axially extending undercut (15k, 150h), associated tab (7, 70a) and locking pin (150, 160) are arranged such that, in use, there is axial play between the or each associated tab (7, 70a) and locking pin (15o, 160).

19. A releasable connector assembly according to claim 11, wherein the or each locking pin (15o, 160) extends from the one of the socket member (3) and plug member (2) via at least one vent hole provided therein.

20. A releasable connector assembly according to claim 11, wherein the or each locking pin (15o, 160) and the or each channel (15, 150) are provided on the socket member (3) whilst the or each associated tab (7, 70a) is provided on the plug member (2).

* * * * *